United States Patent
Jarzembski

[15] 3,688,580
[45] Sept. 5, 1972

[54] CLINICAL THERMOMETER
[72] Inventor: William B. Jarzembski, Shorewood, Wis.
[73] Assignee: Varo, Inc., Garland, Tex.
[22] Filed: July 7, 1970
[21] Appl. No.: 52,853

[52] U.S. Cl. .................73/361, 73/359, 136/222
[51] Int. Cl. ...........................................G01k 7/12
[58] Field of Search .............73/359, 361; 136/222

[56] References Cited

UNITED STATES PATENTS

| | | | |
|---|---|---|---|
| 3,531,992 | 10/1970 | Moore | 73/359 |
| 3,434,349 | 3/1969 | Frischmann | 73/361 |
| 2,025,534 | 12/1935 | Sheard et al. | 73/361 X |
| 3,025,706 | 3/1962 | Oppenheim | 73/362 X |

Primary Examiner—Louis R. Prince
Assistant Examiner—Frederick Shoon
Attorney—Olson, Trexler, Wolters & Bushnell

[57] ABSTRACT

A clinical thermometer for determining the temperature of a particular area of the body of a patient utilizes a disposable thermocouple for temperature sensing. A reference thermocouple is provided within a thermally regulated oven which is maintained at a predetermined temperature. The heat sensing thermocouple and the reference thermocouple cooperate to emit an electrical signal proportional to the difference in temperature between the oven and the sensed area. An indicating device is connected to the two thermocouples and is responsive to the electrical signal for driving a visual display of the temperature at the sensed area.

5 Claims, 10 Drawing Figures

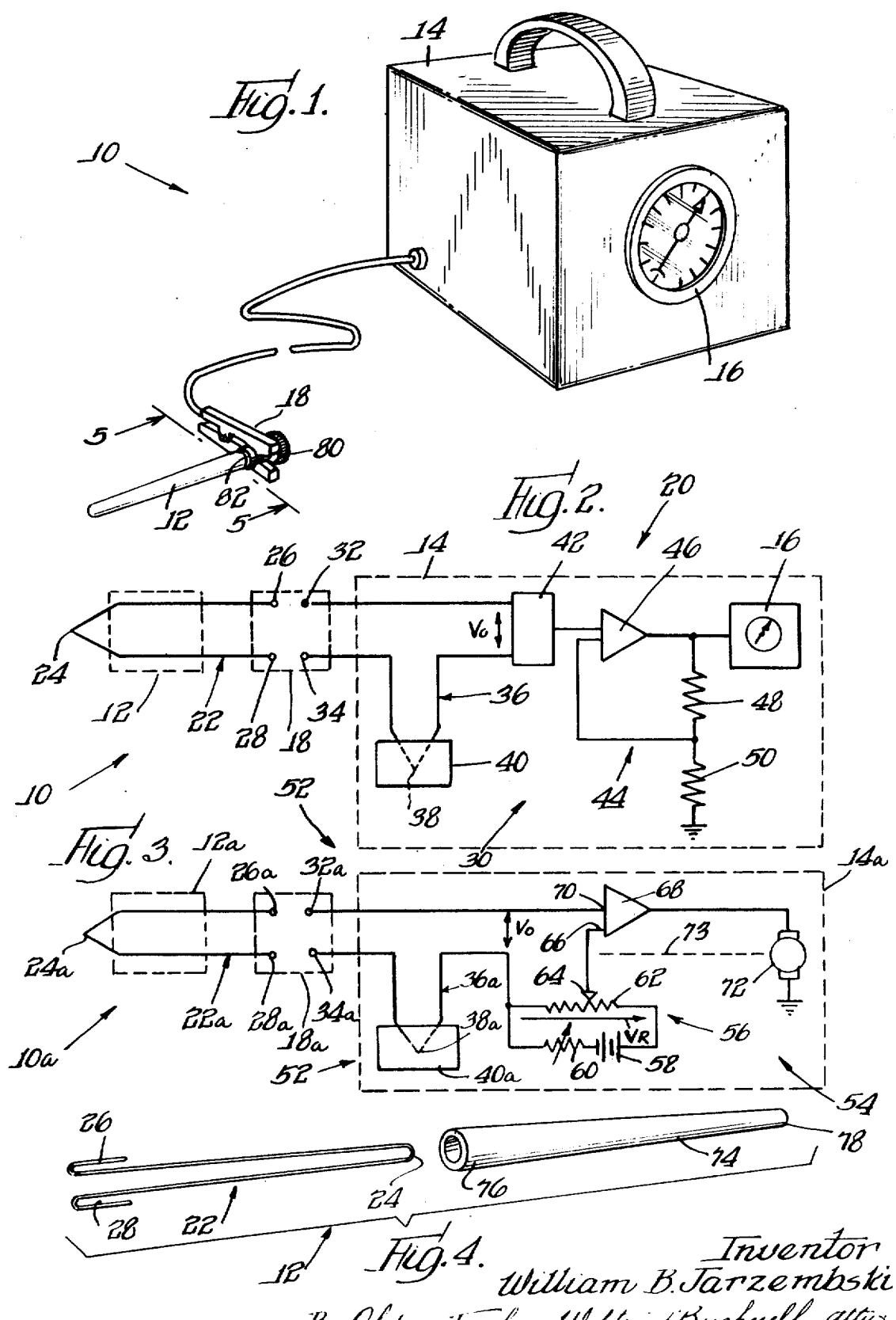

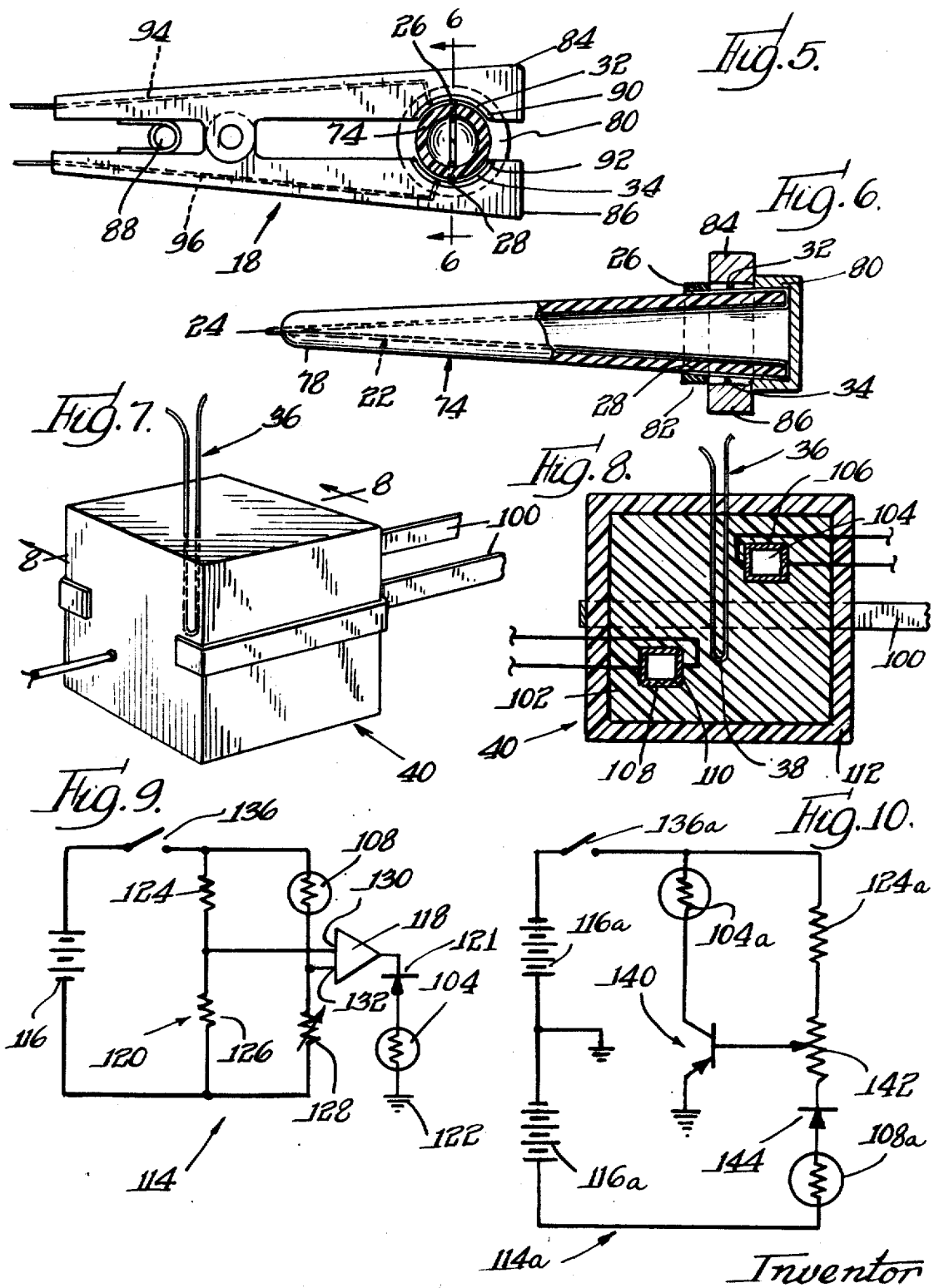

CLINICAL THERMOMETER

SUMMARY OF THE INVENTION

This invention relates generally to heat sensing and temperature indicating devices and more particularly to clinical thermometers.

DISTINCTIONS OVER THE PRIOR ART AND OBJECTS

It is well known that clinical institutions such as hospitals and sanitariums require periodic body temperature determinations of their patients. These temperature readings are taken as often as every 15 minutes for some patients and generally three or four times a day for most patients. When one takes into consideration that a clinical institution treats hundreds of patients at any one time, it is apparent that thousands of temperature readings are required daily. Because clinical institutions, for the most part, utilize costly, frangible, mercury-filled glass thermometers, considerable expense is involved in maintaining an adequate supply of these instruments. It follows that more economical means of securing the necessary data would be desirable. In addition to the high cost of supplying and maintaining an adequate number of conventional thermometers, the actual temperature-taking operation utilizing a conventional thermometer is recognized as being time consuming. The nurse, intern or technician who takes the temperature of the patient must first make sure that the thermometer is clean. He must shake the mercury down and then wait 4 or 5 minutes after the thermometer is inserted in the mouth or rectum of the patient so that the instrument will have time to register. The thermometer must then be cleaned for reuse. Taking into consideration that most clinical institutions are chronically understaffed, it is also therefore quite important to reduce the time spent in taking temperatures.

In addition, it is generally accepted that conventional glass thermometers may constitute a health hazard. The thermometers not only may be infected with germs from the individuals handling them, but more importantly, the thermometers may transfer disease germs from the mouths or rectums of other patients.

Accordingly, a general object of the present invention is to provide a new and improved clinical thermometer which may be utilized at a relatively low cost.

Another important object of the present invention is to provide a clinical thermometer which may be used to take the temperatures of a large number of patients in a rapid manner.

Yet another object of the present invention is to provide a clinical thermometer which may be used with assurance of asepsis.

A more specific object of the present invention is to provide a clinical thermometer which features a disposable and economically produced heat sensing probe.

While most clinical institutions commonly use the ordinary, mercury-filled glass thermometer, thermocouple type clinical thermometers are also known. A thermocouple is a device conventionally comprised of two dissimilar metals in the form of wires which are soldered or welded together so as to form a junction. When the thermocouple junction is heated, a voltage is created across the unconnected ends of the dissimiliar metal wires, the voltage being proportionally to the temperature of the junction. Various pairs of metals are used, for example, antimony and bismuth, copper and iron, or copper and constantin (an alloy of copper and nickel).

The prior art clinical thermometer of the thermocouple type generally include two thermocouples, one being used to sense the temperature of the patient and the other being used for reference purposes. Specifically, the voltage output of the sensing thermocouple is combined with the voltage output of the reference thermocouple for producing a differential voltage signal. The voltage output of the reference thermocouple is maintained at a fixed value while the voltage output of the sensing thermocouple varies with the intensity of heat sensed. The resultant differential voltage output is then applied to an electrical indicating device such as a galvanometer which is appropriately calibrated in degrees Fahrenheit for visually indicating the temperature of the sensed area.

The prior art thermocouple type clinical thermometers ordinarily require some type of device for maintaining the reference thermocouple at a constant temperature. Many such devices have been disclosed in the prior art and include, for example, heat-emitting resistors positioned adjacent the junction of the thermocouple. Steam-emitting devices have also been proposed. It has been found, however, that such devices do not accurately maintain the reference thermocouple at a fixed temperature and therefore produce inaccuracies in the readings.

Accordingly, another general object of the present invention is to provide a new and improved clinical thermometer of the thermocouple type which utilizes a reference thermocouple that is accurately maintained at a fixed temperature.

A more specific object of the present invention is to provide an accurately controlled heat source for use with thermocouple type clinical thermometers.

Other objects and advantages of the present invention will become apparent from the following description of the accompanying drawings wherein:

FIG. 1 is a perspective view of a clinical thermometric apparatus constructed in accordance with the present invention;

FIG. 2 is an electrical schematic diagram of one embodiment of the clinical thermometric apparatus of FIG. 1;

FIG. 3 is an electrical schematic diagram of a second embodiment of the clinical thermometric apparatus of FIG. 1;

FIG. 4 is an exploded perspective view of a disposable heat sensing probe constructed in accordance with the present invention;

FIG. 5 is an enlarged side view of a connecting device to be utilized with the clinical thermometric apparatus taken along line 5—5 in FIG. 1;

FIG. 6 is a sectional view of the connecting device generally taken along line 6—6 in FIG. 5;

FIG. 7 is an enlarged perspective view of an oven device to be utilized with the clinical thermometric apparatus of FIG. 1;

FIG. 8 is a cross-sectional view of the oven device, generally taken along line 8—8 in FIG. 7;

FIG. 9 is a schematic diagram of a heat regulating circuit to be utilized with the oven device; and FIG. 10 is a schematic diagram of a modified heat regulating circuit.

Turning now to a detailed consideration of the drawing and specifically FIG. 1, clinical thermometric apparatus constructed in accordance with the present invention is indicated generally by the reference numeral 10. The clinical thermometer 10 is used to sense the temperature of a selected region of a patient's body and to give a visual indication corresponding thereto. In order to accomplish this, a disposable heat sensing probe 12 is arranged to be placed in direct thermal communication with the region to be tested. A measuring and indicating assembly, to be described hereinafter, is mounted within a portable housing 14 and is connectable to the heat sensing probe 12 for use in determining the temperature of the selected region as well as visually displaying the temperature in an appropriate scale of values.

The heat sensing probe 12 is arranged to be inexpensively produced, making it economically feasible for a clinical institution such as a hospital to dispose of it after only one use. The probe includes a thermocouple, of the type described hereinabove, for transducing the thermal condition of the area being sensed to a proportional electrical signal, the signal being utilized by the measuring and indicating assembly for ultimately indicating the temperature of the sensed area in a manner to be described more fully hereinafter.

The portable housing 14 is fashioned as a rectangular case having one outside panel inset with the indicating face of an electrical measuring device 16. While the indicating device 16 responds to electrical signals, specifically current in the disclosed embodiment, it is advantageously calibrated in degrees Fahrenheit so as to indicate the temperature of the sensed area. The apparatus 10 further includes a connecting device 18, which provides a unique way of mechanically and electrically connecting and disconnecting the heat sensing probe with the measuring and indicating assembly so that the clinical thermometer may be operated in an efficient manner.

The thermometer 10 will ordinarily be used for measuring the temperature of one or more selected regions of the institutionalized patients. To accomplish this in a rapid manner, the nurse, intern or other employee of the clinical institution merely carries the portable housing 14 from one patient to another, assembling a fresh heat sensing probe 12 to the connecting device 18 each time the device is used. Because the heat sensing probe may be presterilized and disposed of after only one use, valuable time is saved as compared with conventional glass thermometers which require sterilization after each use. In addition, the clinical thermometer 10 gives an immediate temperature reading, as will be described hereinafter, eliminating the time delays which are required by the conventional thermometers.

Turning to FIG. 2, the clinical thermometer 10 embodies an electrical circuit 20 which includes a sensing thermocouple 22 having a thermocouple junction 24 and connecting terminals 26 and 28. The sensing thermocouple is mounted within and comprises part of the heat sensing probe 12, and is provided for directly sensing the heat of a selected area. The clinical thermometer 10 further includes a measuring and indicating circuit 30 which is connectable to the sensing thermocouple 22 and located within housing 14. The circuit 30 is arranged for accurately and reliably indicating the temperature of the desired area, and includes two input terminals 32 and 34 extending outside of the housing 14 for appropriately connecting the circuit to terminals 26 and 28 of the sensing thermocouple 22 using the connecting device 18.

The measuring and indicating circuit 30 further includes a reference thermocouple 36 having a thermocouple junction 38 disposed within a heat regulated oven 40. Reference thermocouple 36 and sensing thermocouple 22 are appropriately connected to provide a thermal transducer. Specifically, the thermocouples 22 and 36 are connected in series, with like metal conductors of each connected together for producing an electrical thermal indicating potential $V_o$ which is proportional to the difference in thermal content of the respective areas sensed by each thermocouple.

A modulator 42 is connected across the thermocouples 22 and 36 for enhancing the current signal corresponding to the thermal indicating potential $V_o$. The output of modulator 42 is amplified by a circuit 44 which includes an amplifier 46, a feedback resistor 48 and a grounding resistor 50. Both the modulator 42 and the amplifying circuit 44 comprise part of the measuring and indicating circuit 30 and both are positioned within housing 14.

After the current corresponding to the thermal indicating potential $V_o$ has been modulated and amplified, it is fed to the indicating device 16 which may be an ammeter or a galvanometer for example. While the indicating device 16 measures the output current from amplifying circuit 44, it is desirably calibrated in degrees Fahrenheit so as to indicate the difference in temperature between the area sensed and the oven 40.

In accordance with an important feature of the present invention, the oven 40 is arranged to maintain the heat therein at a fixed temperature with an error of no more than about 0.1° Fahrenheit. While the oven 40 and associated controls will be described in detail hereinafter, it will suffice now merely to state that the oven may be maintained at any reasonable temperature. However, it has been found that accuracy is enhanced if the oven is heated well above ambient temperature.

In actual operation, when the oven 40 is maintained at a temperature of, for example, 110° F. and the heat sensing probe 12 is placed in a patient's mouth for sensing his overall body temperature, a potential $V_o$ proportional to the difference between 110° F. and the temperature of the patient will be fed to the modulator 42. With the indicating device 16 properly calibrated and nulled, the indicating device will visually indicate the actual temperature of the patient. By utilizing the clinical thermometer 10, this procedure can be carried out in a matter of 4 or 5 seconds as compared to four or five minutes when using a conventional mercury thermometer.

Directing attention to FIG. 3, a modified clinical thermometer 10a is shown. Since thermometer 10a is similar, in certain respects, to thermometer 10, like numerals have been used to designate like parts, the suffix letter "a" being utilized to distinguish those parts used in the thermometer 10a. Specifically an electrical circuit 52 of the clinical thermometer 10a includes a modified measuring and indicating circuit 54, circuit 52 additionally utilizing a servo assembly 56 for visually indicating the temperature sensed by thermocouple 22a.

The servo assembly 56 is connected across the series connected thermocouples 22a and 36a and includes a direct current power supply 58, such as, for example, a mercury cell. Supply 58 is connected in series with a variable resistor 60 in order to produce an independent, variable reference potential $V_R$. The potential $V_R$ is applied across a resistor 62 which is connected in parallel circuit with the power supply 58 and the variable resistor 60. A selectively positionable tap 64 is movably connected at one end to the resistor 62 and is electrically connected at its otherwise free end to a first input terminal 66 of a differential amplifier 68 for supplying voltage thereto. A second input terminal 70 of differential amplifier 68 is disengageably connected to the sensing thermocouple 22a through the connecting device 18a so that the potential $V_o$ may be applied thereto.

The differential amplifier 68 delivers a current at its output that corresponds in polarity to a difference in the potentials from the inputs at terminals 66 and 70. This output current is used to drive a reversible servo motor 72 which is grounded as indicated in FIG. 3 and which may, for example, be arranged as a direct current servo motor with a direct current operational amplifier. The servo motor is mechanically connected to movable tap 64 by a link arrangement 73 for driving the tap across the resistor 62 in a direction dependent upon the polarity of the output of the differential amplifier 68, which polarity is in turn dependent upon whether the potential $V_o$ is greater or less than the reference potential $V_R$.

Operationally, when the potential $V_o$ is different from the independent reference potential $V_R$, creating a potential difference at the inputs of amplifier 68, the corresponding output current of the differential amplifier energizes the servo motor 72 in the appropriate direction so as to drive the movable tap as stated above. The movable tap is driven across resistor 62 until the potential difference at the inputs of the amplifier is zero, at which point the current output therefrom is also zero. This condition deenergizes the servo motor 72 for stopping the movable tap. Since the movable tap 64 is now positioned on resistor 62 such that the potential delivered by resistor 62 is equal to the output reference potential $V_o$, it becomes readily apparent that the output from resistor 62 can be calibrated in degrees Fahrenheit and appropriately nulled for indicating the temperature sensed by sensing thermocouple 22.

Turning to FIG. 4, the heat-sensing probe 12 is shown in exploded view and includes the reference thermocouple 22 which is mounted with and extends through an elongated probe or stem portion 74. In the embodiment shown, the stem portion 74 has a frusto-conical shape, tapering from a rear or coupling end 76 to a blunt tipped front or sensing end 78 for easy insertion into the mouth or rectum of a patient for sensing the temperature thereat.

It is to be understood that the probe is not limited to the above described shape but may be modified to conform with other uses.

The junction 24 of the heat sensing thermocouple 22 extends out from the tip of the probe or stem portion at the forward or sensing end 78 for thermally contacting the selected area and may, if desired, be covered with a very thin film of a selected polymer. The free or terminal ends 26 and 28 of the thermocouple extend out from the back end of the probe and are disengageably coupled to the connecting device 18 as will be seen hereinafter.

The probe or stem portion 74 is made from an inexpensive, moderately flexible, thermally insulative and electrically nonconductive material such as polyethylene or polypropylene. In addition, the thermal insulating characteristic of the material precludes thermal energy from transferring from the selected area to the probe, which would otherwise cause blood to withdraw therefrom as is the case when utilizing a high thermally conductive glass thermometer. This feature is important in that it allows for a more rapid temperature reading.

The heat sensing probe 12 is preferably mass produced by, for example, multiple cavity molding. In such a case, the heat sensing thermocouple 22 is placed within a die or cavity and molten material such as polyethylene is injected into the die and allowed to solidify around the thermocouple. It has been found that this procedure provides for a highly inexpensive probe which may be sold to a clinical institution at a sufficiently low price to be disposable after only one use.

Referring now to FIG. 6, the outwardly extending terminal ends 26 and 28 of thermocouple 22 are formed around the back end of the stem portion 74 and engage the external surface thereof, the terminal ends being secured thereto by a cup-shaped cap 80 which is preferably made of the same material as the probe and a cylindrical band 82 of a heat shrinkable material such as polyvinyl chloride or polyethylene. The cap 80 is mounted to the end 76 of the probe or stem portion and the band 82 is grippingly mounted around the periphery of the stem portion spaced-apart forwardly of the cap to expose portions of the ends 26 and 28 for connection with device 18 in a manner described with respect to FIG. 5. The band 82 is shrunk by the application thereto of heat, for clamping down the ends of terminals 26 and 28.

Turning now to FIG. 5, the connecting device 18 includes two identical opposing gripping portions 84 and 86 pivotally connected and spring biased together by a resilient spring device 88. The gripping portions 84 and 86 include opposing arcuate cavities 90 and 92 transversing their respective inner surfaces and dimensioned slightly larger than the corresponding dimension of the probe or stem portion 74. The gripping portions are of sufficient width to snugly fit between the cap 80 and the band 82 as seen in FIG. 6.

Terminals 32 and 34, previously described with respect to FIGS. 2 and 3, are mounted on the confronting surfaces of arcuate cavities 90 and 92 for releasably connecting the heat sensing thermocouple 22 to the indicating circuit 30 through a pair of lead wires 94 and 96, wires 94 and 96 extend through and out the back end of the respective gripping portions 84 and 86.

Turning to FIG. 7 and 8, the heat regulated oven 40 shown in combination with the reference thermocouple 36 is fashioned as a cube to be mounted on an inner wall of the portable housing 14 by a resilient clamping device 100. The oven 40 comprises an inner core 102 which is made of a highly thermally conductive material such as an epoxy casting resin doped with metal powder according to the present invention, the oven 40 is uniformly heated by a heat-providing thermistor 104 that is surrounded by a layer 106 of a thermally conductive dielectric material for providing free heat transfer while electrically insulating the thermistor. A heat sensing or regulating thermistor 108 is mounted within core 102 surrounded by a similar layer 110; and the core 102 is thermally insulated by an outer shell 112 which is made of a low heat conductive material such as an unfilled epoxy resin, polyurethane foam or polystyrene foam. The thermocouple 36 extends through the outer shell and into the core 102. Because the core is uniformly heated, the thermocouple junction may be positioned anywhere therein.

The oven 40 is preferably formed by first potting the high thermally conductive material comprising core 102 around the two thermistors 104 and 108, their associated insulating layers 106 and 110 respectively, and a portion of the thermocouple 36 including its junction 38. The outer shell comprising the low thermally conductive material is thereafter potted around the core and a portion of the thermocouple 36. This method accounts for the cubic shape as seen in FIGS. 7 and 8. It is to be understood, however, that the oven may be made by other processes such as dipping whereby the oven would take on various other forms.

A heat regulating circuit 114 for controlling the temperature within oven 40 is shown in FIG. 9 and comprises a direct current power supply 116 which is connected to the heat-providing thermistor 104, an operational amplifier 118 for regulating the amount of current that reaches the thermistor, a voltage bridge circuit 120, and a diode 121 for preventing thermal runaway. The circuit 120 includes the heat-regulating thermistor 108 for controlling the regulation of operational amplifier 118.

The voltage bridge circuit 120 is connected across the power supply 116 and is maintained in a state of unbalanced potential by heat-regulating thermistor 108 so long as the temperature within the oven is not at its preselected value. When the temperature reaches that value, the heat-regulating thermistor balances the bridge circuit. The operational amplifier 118 is connected to the output of the voltage bridge circuit and is responsive to the potential state of the bridge circuit, that is, if the heat in oven 40 goes below the predetermined temperature, the operational amplifier 118 will emit a continuous current signal at its output for energizing the heat-providing thermistor 104. For this purpose, the thermistor 104 is connected in series between the output of the operational amplifier and a ground connection 122. If the temperature within the oven is maintained at or drifts above the predetermined value, then the operational amplifier emits no current signal.

In addition to the thermistor 108, the voltage bridge circuit 120 comprises two identical resistors 124 and 126 and a variable resistor 128, all of which are bridge-connected across the power supply 116, as shown, with thermistor 108 and resistor 128 connected in a common leg thereof. Equal voltages appear across each of resistors 124 and 126 whereas the voltage across resistor 128 is dependent upon the internal resistance of thermistor 108. Accordingly, the thermistor 108 is selected to have on internal resistance which equals that of the individual resistors when the temperature in oven 40 is at the predetermined value. In other words, when the temperature within the oven is at its selected value, for example, 110° F., the voltages across all three resistors and across the thermistor are equal and the voltage bridge 120 is balanced potentially. If the temperature within the oven strays below 110° F., the internal resistance of heat-regulating thermistor 108 will decrease causing the voltage thereacross to increase proportionately, activating amplifier 118 to energize heat-providing thermistor 104.

The operational amplifier 118 is provided with a first input 130 connected intermediate resistors 124 and 126 for maintaining it at a constant potential, i.e., potential across resistor 124. A second input 132 is connected intermediate thermistor 108 and resistor 128 so that the potential thereat varies with the internal resistance of thermistor 108 and therefore with the temperature within oven 40.

The heat-providing thermistor 104 is fabricated to possess an internal resistance which rises with an increase in temperature within oven 40, the thermistor being manufactured so that no appreciable current will pass through it when the temperature within oven 40 goes above the selected target value. In this manner, the thermistor 104 provides its own independent regulating means for assuring that it will not overheat the oven.

From the foregoing descriptions, it will be apparent that the temperature within oven 40 is most accurately maintained when the surrounding ambient temperature is always below the predetermined value. In such a case there is no effect from ambient heat which might otherwise cause the oven to overheat. It has been found that by utilizing this procedure the temperature within oven 40 can be accurately maintained within a maximum error of 0.1° F.

Turning to FIG. 10, a modified heat-regulating circuit 114a is shown. Since heat regulating circuit 114a is similar, in certain respects, to heat regulating circuit 114, like numerals have been used to designate like parts, the suffix letter "a" being utilized to distinguish those parts used in the circuit 114a. Specifically, the heat-regulating circuit 114a includes a heat-providing thermistor 104a, a heat-regulating thermistor 108a, a power supply 116a, a resistor 124a and a switch 136a. However, the modified circuit is distinguished by its use of a high gain silicon transistor 140.

In the embodiment of FIG. 10, the thermistor 108a is advantageously selected to possess a temperature characteristic such that its resistance drops approximately 5 percent per degree C. By employing a bridge including the thermistor 108a, the resistor 124a, a balance resistor 142, a diode 144 and the ground-connection separated sections of battery 116a, the absolute value of voltage change produced by the thermistor 108a may be increased to approximately 500 mv. per degree C., thus dwarfing the error due to temperature sensitivity of the transistor 140. This arrangement of circuit 114a avoids having the transistor effect as a limiting factor in stability. To further decrease error due to transistor temperature instability, the diode 144 is included and selected to be a silicon diode having temperature characteristics matching those of the transistor 140. Furthermore, the thermistor 104a is selected to be a negative thermistor in order to provide maximum heating for warm up and less sensitivity at the control temperature whereby to prevent excessive cycling.

It is to be understood that two or more cascaded transistors such as a Darlington Pair can be substituted for transistor 140 in which case heat-providing thermistor 104a would be connected to the last transistor.

While particular embodiments of the invention have been shown, it should be understood, of course, that the invention is not limited thereto since many modifications may be made. It is therefore contemplated to cover by the appended claims any such modifications that fall within the true spirit and scope of the invention.

The invention is claimed as follows:

1. A clinical thermometer comprising: thermal reference means including a temperature-regulated portion; heat-providing means mounted within said temperature regulated portion for generating heat therein; heat-regulating means including heat-sensing means mounted within said temperature-regulated portion for sensing the temperature therein, said heat-regulating means being operatively connected to said heat-providing means and responsive to said heat-sensing means for regulating the amount of heat generated by said heat-providing means whereby the temperature of said temperature-regulated portion is maintained at a fixed value; sensing thermocouple means for sensing the temperature of a selected area of a patient's body; reference thermocouple means positioned within said temperature-regulated portion for sensing the temperature therein, said sensing thermocouple means and said reference thermocouple means being electrically connected together for producing an electrical signal proportional to the difference in temperature between said selected area and said temperature-regulated portion; and indicating means connected to both of said thermocouples and responsive to said electrical signal for indicating the temperature of said particular area, wherein said heat-providing means and said heat-sensing means include respective heat-providing and heat-sensing thermistor elements positioned within said temperature-regulated portion.

2. A clinical thermometer according to claim 1 wherein said temperature-regulated portion comprises a highly thermally conductive material, said thermal reference means further including an outer portion in contacting relationship with and surrounding substantially the entire outer surface of said temperature-regulated portion, said outer portion being made from a low thermal conductive material for thermally insulating said temperature-regulated portion.

3. A clinical thermometer according to claim 1 wherein said heat-regulating means further includes a power supply connected to said heat-providing thermistor element for delivering current thereto, heat-regulating circuit means connected to said power supply and said heat-providing thermistor element for regulating the amount of current that reaches said heat-providing thermistor element, and circuit control means including said heat-regulating thermistor element connected to said heat-regulating circuit means for controlling the regulation thereof whereby the temperature of said temperature-regulated portion is maintained at a fixed value.

4. A clinical thermometer according to claim 3 wherein said power supply comprises a pair of direct current power supplies, a conductor connecting said supplies in series, and a ground connection connected to said conductor and wherein said heat-regulating circuit means includes a diode, a resistor and a balance resistor connected in bridge circuit relationship with said heat-regulating thermistor element and said power supplies whereby minimize the temperature sensitivity of said heat-regulating thermistor element.

5. A clinical thermometer according to claim 4 wherein said diode is a silicon diode having temperature characteristics matching those of said heat-regulating thermistor element.

* * * * *